H. DAVIS.
LAMP HOUSE FOR PROJECTION CAMERAS.
APPLICATION FILED NOV. 28, 1916.
1,270,269.
Patented June 25, 1918.
4 SHEETS—SHEET 1.
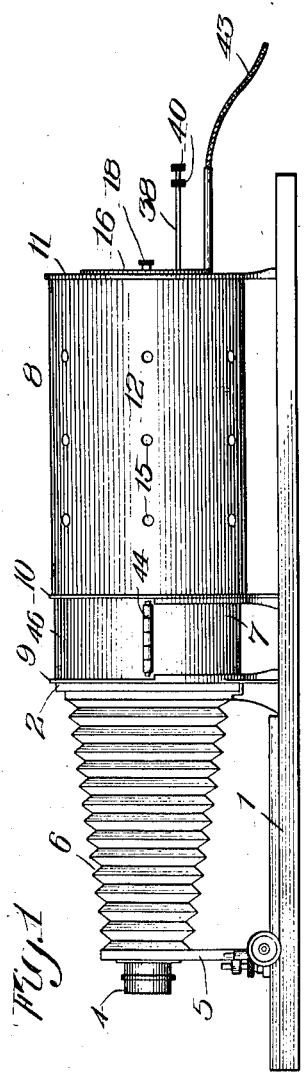
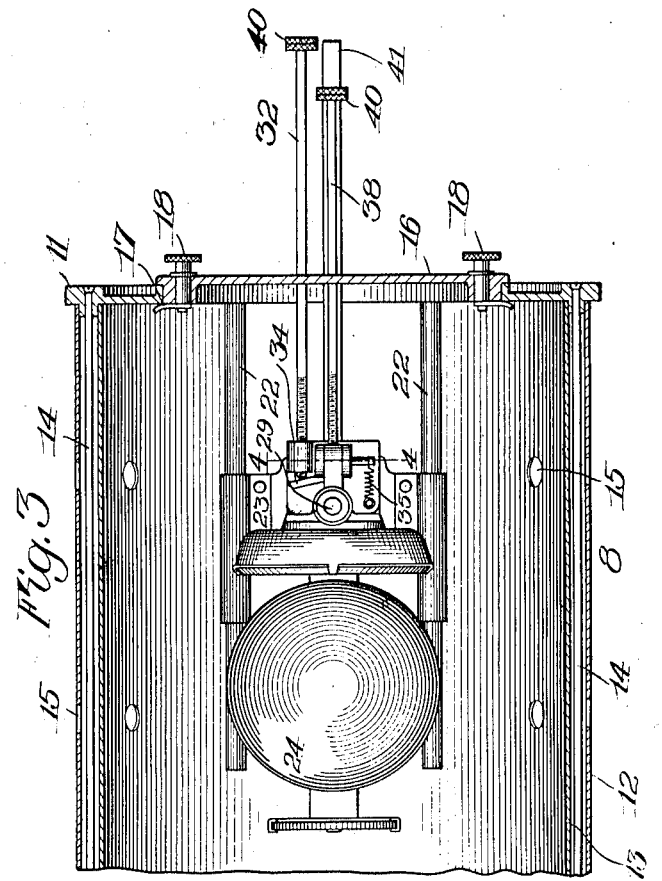
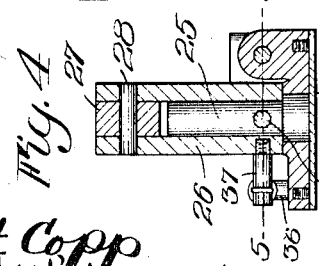
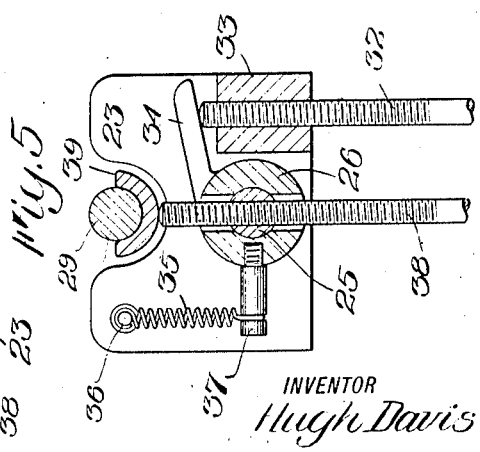
INVENTOR
Hugh Davis
BY
His ATTORNEYS

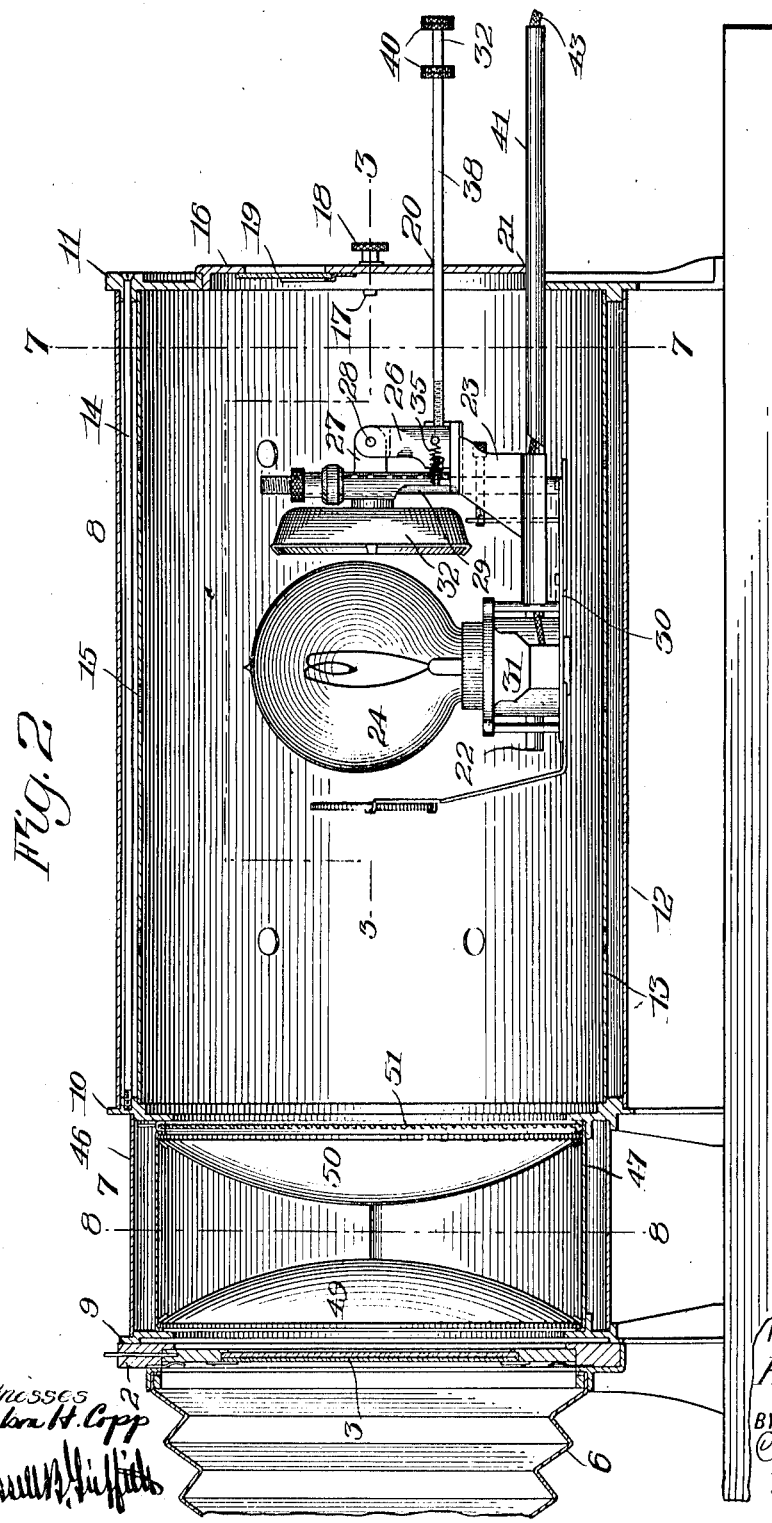

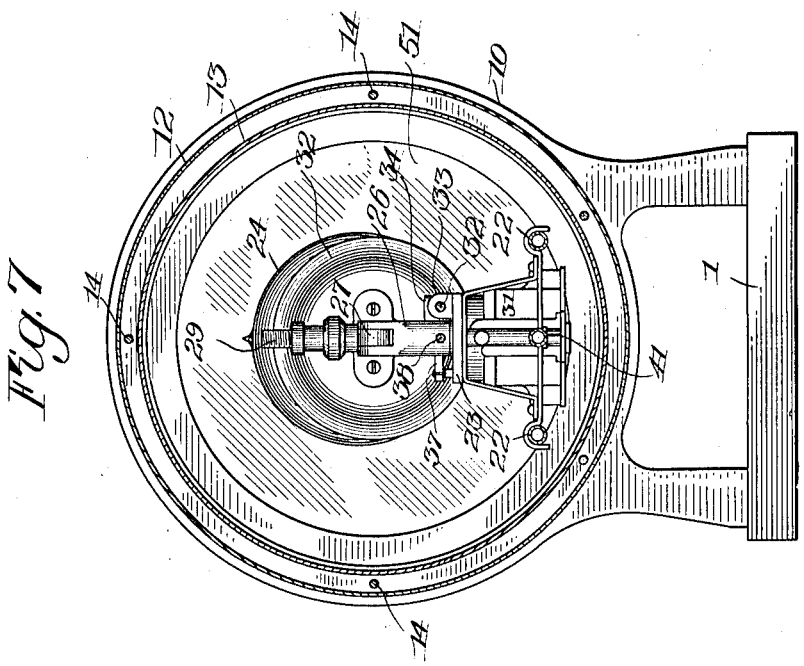
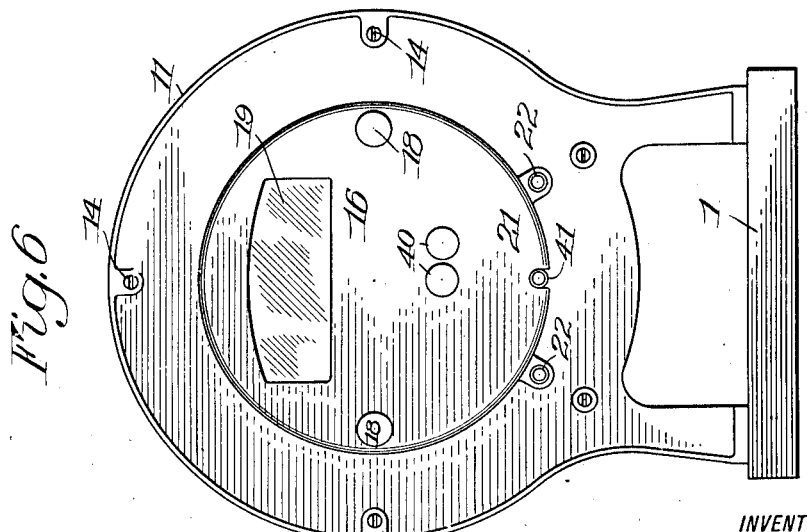

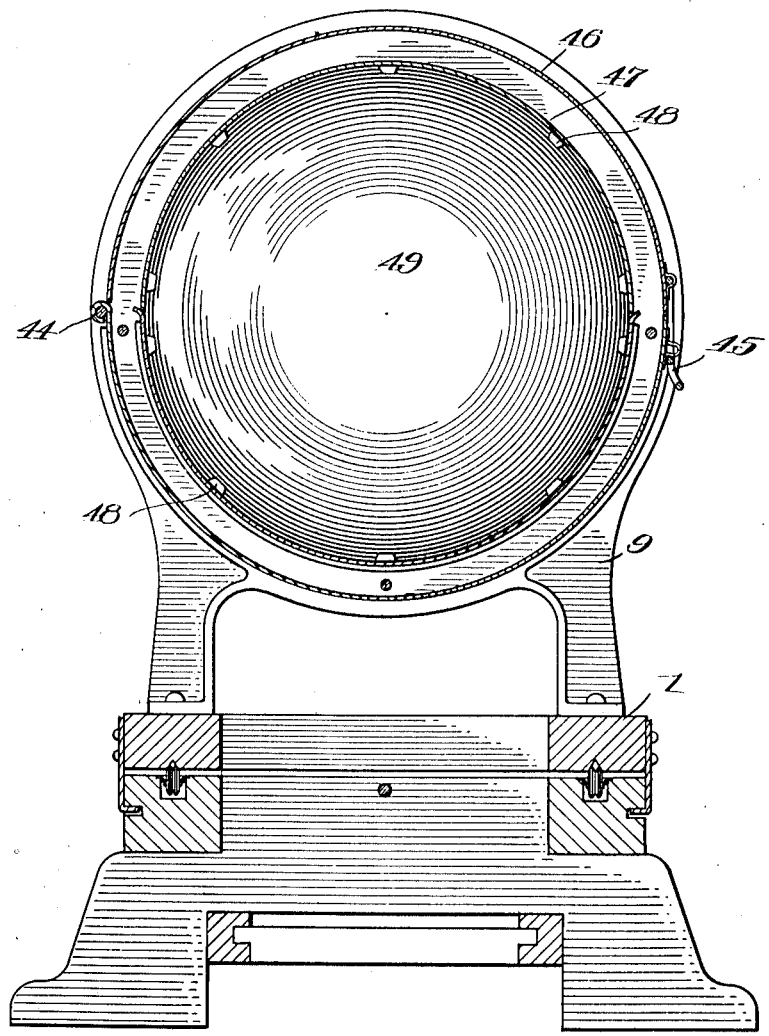

UNITED STATES PATENT OFFICE.

HUGH DAVIS, OF ROCHESTER, NEW YORK, ASSIGNOR TO EASTMAN KODAK COMPANY, OF ROCHESTER, NEW YORK, A CORPORATION OF NEW YORK.

LAMP-HOUSE FOR PROJECTION-CAMERAS.

1,270,269.     Specification of Letters Patent.    Patented June 25, 1918.

Application filed November 28, 1916. Serial No. 133,969.

*To all whom it may concern:*

Be it known that I, HUGH DAVIS, of Rochester, in the county of Monroe and State of New York, have invented certain new and useful Improvements in Lamp-Houses for Projection-Cameras; and I do hereby declare the following to be a full, clear, and exact description of the same, reference being had to the accompanying drawings, forming a part of this specification, and to the reference-numerals marked thereon.

My present invention relates to photography and more particularly to photographic enlarging cameras by means of which the image of a negative is projected on an enlarged scale on a sensitive medium for the use of artificial light and the invention has for its object to provide an improved lamp house for the projector that will offer certain conveniences in the manipulation of the lamp and its appurtenances as well as adding to its efficiency. To these and other ends the invention resides in certain improvements and combinations of parts all as will be hereinafter more fully described, the novel features being pointed out in the claim at the end of the specification.

In the drawings:

Figure 1 is a side elevation of an enlarging or projection apparatus provided with a lamp house constructed in accordance with and illustrating one embodiment of my invention;

Fig. 2 is an enlarged longitudinal central section through the lamp house;

Fig. 3 is a fragmentary horizontal section taken substantially on the line 3—3 of Fig. 2;

Fig. 4 is an enlarged detail section taken substantially on the line 4—4 of Fig. 3;

Fig. 5 is an enlarged detail section taken substantially on the line 5—5 of Fig. 4;

Fig. 6 is a rear elevation;

Fig. 7 is a transverse section taken substantially on the line 7—7 of Fig. 2, and Fig. 8 is a transverse section taken substantially on the line 8—8 of Fig. 2;

Similar reference numerals throughout the several views indicate the same parts.

Referring first more particularly to Fig. 1, the projection camera as a whole comprises a base or bed 1, a body frame 2 in which the negative is placed, as shown at 3 in Fig. 2, a forwardly arranged lens 4 on an adjustable front 5, a bellows 6 connecting the front and body frame, a casing 7 in rear of the latter for the reception of the diffusing and condensing elements and a casing 8 in rear of the casing 7 and which casing houses the lamp. Both of the casings 7 and 8 are preferably cylindrical and embody shells held in supporting rings 9, 10 and 11.

The lamp casing 8 consists of an outer shell 12 and an inner shell 13 held in spaced relation by being clamped between the rings 10 and 11 by bolts 14 lying between them. Both shells are provided with openings 15 for ventilation, which openings are staggered relatively to each other so that they will not permit the direct passage of light to the exterior. The rear wall of the casing is formed by the ring 11 and by a detachable door 16 which, in the present instance, is circular and is held in place by rotary catches 17 arranged at opposite sides and provided with external knobs 18. The door may have a ruby window 19 and is provided with two apertures 20 near its center and an aperture 21 at the bottom for purposes that will hereinafter appear.

Within the chamber 13 and near its bottom are two guide rods 22 supported in the ring 11 and projecting forwardly and movable on these rods is a sliding carriage 23 carrying a lamp 24. The lamp is mounted in the following manner. The carriage is yoke shaped with a raised center upon which is mounted a fixed pivot pin 25 (Figs. 4 and 5) on which turns a bracket 26. A forwardly extending arm 27 pivoted to this bracket at 28 supports a vertical rod 29 carrying at its lower end a forward extension 30 with a lamp socket 31 thereon to which the lamp 24 is attached. There is a reflector 32 also mounted on the rod 29 in the present instance and provided with means for effecting its vertical adjustment which adjustment is, however, immaterial to the present invention. With this construction it will be seen that the lamp 24 may be swung from side to side to adjust the light by turning the bracket 26 on its pin 25 while the lamp may be swung up and down by rocking the arm 27 on the pivot 28 of the bracket. The bracket 26 is turned for the former purpose by an adjusting rod 32 threaded into a boss 33 on the carriage 23 that acts against an arm 34 on the bracket. This arm is held in engagement with the end of the rod by a spring 35 connected to the carriage at 36 and to the bracket at 37. The arm 27 is rocked for the latter purpose by an adjusting rod 38 threaded through the pin 25 and engaging an extension 39 of the arm 27.

The two adjusting rods 32 and 38 extend rearwardly through the apertures 20 in the door 16 and terminate exteriorly in nuts 40. By grasping these together the carriage 23 may be slid longitudinally on the guide rods 22 to carry the lamp toward and from the negative 3 or by rotating them individually, the described lateral and vertical adjustments of the lamp may be effected. When the nuts 40 are removed the door 16 may be taken off by slipping it over the ends of the rods leaving the lamp in place or the door, when unlocked, can be detached while still on the rods when the lamp is removed from the casing by lifting it off of the guide rods 22. The nuts 40 are preferably made in two parts as indicated so that they can be locked against each other to prevent them from coming off when it is desired to rotate the rods by means of them.

Carried rigidly on the carriage 23 is a rearwardly extending tube 41 that passes out through the aperture 21 at the bottom of the door 16 to the exterior of the casing and the electric wires 43 for the lamp 24 pass to the exterior through this tube, as shown, so that they are protected and prevented from wear. The apertures 20 and 21 are practically closed by the parts that pass through them against the escape of light and the members 32, 38 and 41 in connection with them, serve as guides for holding the lamp carriage on the guide rods 22.

The top of the casing 7 is semi-circular and hinged to the bottom half at 44, as shown in Figs. 1 and 8, the two parts being secured together at the other side by a suitable catch device 45. This casing is also composed of outer and inner shells 46 and 47 and the inner one is provided at circumferential intervals at each end with ears 48 that form seats for the condensing lenses 49 and 50. The ground glass or other diffusing element 51 is seated between the rear lens 50 and the ring 10 and all of these parts may be placed in position or removed easily and conveniently by swinging back the upper or cover portion of the casing.

I claim as my invention:

In a lamp house for projection apparatus, the combination with a casing having two guide rods therein and a detachable door provided with an aperture, of a lamp carriage slidable on the guide rods and detachable upwardly therefrom, a lamp adjustable on a horizontal pivot on the carriage and an operating rod for both adjusting the lamp and moving the carriage extending closely through the aperture in the door so that the lamp, operating rod and door may be removed together.

HUGH DAVIS.

Witnesses:
 MARGARET DUIGNAN,
 HELEN M. FRASER.